United States Patent [19]
Haeberle et al.

[11] Patent Number: 5,350,823
[45] Date of Patent: Sep. 27, 1994

[54] COPOLYMERS CROSSLINKING AT ROOM TEMPERATURE

[75] Inventors: Karl Haeberle, Neustadt; Gerhard Bauer, Weinheim; Lothar Maempel, Bruehl, all of Fed. Rep. of Germany

[73] Assignee: BASF Aktiengesellschaft, Ludwigshafen, Fed. Rep. of Germany

[21] Appl. No.: 135,617

[22] Filed: Oct. 14, 1993

[30] Foreign Application Priority Data

Nov. 3, 1992 [DE] Fed. Rep. of Germany ....... 4237030

[51] Int. Cl.$^5$ ............................................. C08F 26/02
[52] U.S. Cl. ................................................... 526/301
[58] Field of Search ......................................... 526/301

[56] References Cited

U.S. PATENT DOCUMENTS 3,542,739 11/1970 Krimm et al. .
4,396,738 8/1983 Powell et al. .
4,659,795 4/1987 Tsutsui et al. .

FOREIGN PATENT DOCUMENTS 0003516 8/1979 European Pat. Off. .
0206059 12/1986 European Pat. Off. .
2454253 5/1976 Fed. Rep. of Germany .
3112117 10/1982 Fed. Rep. of Germany .
4121946 1/1993 Fed. Rep. of Germany .

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

Copolymers are composed of
  a) from 0.01 to 40% by weight of a copolymerized ethylenically unsaturated compound having at least one isocyanate group blocked with an oxime,
  b) from 30 to 99.99% by weight of at least one $C_1$–$C_{20}$-alkyl (meth)acrylate, one vinyl ester of carboxylic acids of 1 to 20 carbon atoms, one vinylaromatic of up to 20 carbon atoms, one ethylenically unsaturated nitrile of 3 to 6 carbon atoms, one vinyl halide or one nonaromatic hydrocarbon of 4 to 8 carbon atoms having at least 2 conjugated double bonds,
  c) from 0 to 30% by weight of at least one comonomer having at least one keto or aldehyde group and
  d) from 0 to 50% by weight of at least one further monomer.

2 Claims, No Drawings

COPOLYMERS CROSSLINKING AT ROOM TEMPERATURE

The present invention relates to copolymers composed of
- a) from 0.01 to 40% by weight of a copolymerized ethylenically unsaturated compound having at least one isocyanate group blocked with an oxime,
- b) from 30 to 99.99% by weight of at least one $C_1-C_{20}$-alkyl (meth)acrylate, one vinyl ester of carboxylic acids of 1 to 20 carbon atoms, one vinylaromatic of up to 20 carbon atoms, one ethylenically unsaturated nitrile of 3 to 6 carbon atoms, one vinyl halide or one nonaromatic hydrocarbon of 4 to 8 carbon atoms having at least 2 conjugated double bonds,
- c) from 0 to 30% by weight of at least one comonomer having at least one keto or aldehyde group and
- d) from 0 to 50% by weight of at least one further monomer.

The present invention furthermore relates to the use of these copolymers as coating materials or adhesives, and to substrates coated with these copolymers.

Copolymers which are used in coating materials or in adhesives are often crosslinkable copolymers. For example, protective coatings or adhesive layers having good elastic properties, high cohesion and good resistance to chemicals and solvents can be obtained by crosslinking.

For crosslinking, a crosslinking agent which reacts with functional groups in the copolymer is generally added to the copolymers. Examples of possible crosslinking agents are polyisocyanates which react with hydroxyl or amino groups.

DE-A-35 21 618 discloses corresponding aqueous adhesive formulations in which polyisocyanates dispersed in water are added to aqueous dispersions of copolymers obtained by free radical polymerization, which act as crosslinking agents. Similar adhesive formulations are also described in U.S. Pat. No. 4,396,738 and DE-A-31 12 117.

However, the poor shelf life is a disadvantage of these aqueous formulations. The polyisocyanate must therefore be dispersed in water and mixed with the copolymer shortly before said polyisocyanate is used as the crosslinking agent.

A longer shelf life can be achieved by reacting the isocyanate groups with blocking agents, for example oximes, caprolactam, phenols or dialkyl maleates. The resulting blocked polyisocyanates hydrolyze only to a minor extent in aqueous dispersion.

DE-A-38 07 555 relates to such an oxime-blocked diisocyanate which is dispersed in water and is suitable as an additive for polymers dispersed in water.

DE-A-24 54 253 furthermore discloses that ethylenically unsaturated oxime-blocked isocyanates can be used as comonomers and the resulting copolymers can be crosslinked by adding compounds having reactive groups, for example hydroxyl groups. Moreover, EP-A-445 739 discloses that self-crosslinking copolymers can be used as coating materials. These copolymers contain both oxime-blocked isocyanate groups and groups which are reactive with isocyanates.

However, crosslinking reactions take place in these crosslinking systems only after elimination of the blocking agent at elevated temperatures.

Aqueous adhesive formulations known to date and containing polyisocyanates as crosslinking agents therefore either have a short shelf life and can thus be used only as a 2-component system or crosslink only at elevated temperatures.

Aqueous dispersions which have a long shelf life and crosslink at room temperature after removal of the solvent are disclosed in EP-A-3516. These dispersions contain polyhydrazides which react with monomers polymerized in the copolymer and having carbonyl groups.

Systems which have a long shelf life and crosslink at room temperature are also described in the unpublished German Patent Application P 41 21 946. In these crosslinking systems, oxime-blocked, saturated isocyanates are added to keto- or aldehyde-containing copolymers as crosslinking agents. In the case of incomplete crosslinking, there is the disadvantage here that unbound crosslinking agents may subsequently migrate, for example out of a prepared coating.

It is in principle desirable to develop further dispersions having a long shelf life and crosslinking at room temperature, in order to provide alternatives to polyhydrazide crosslinking.

It is an object of the present invention to provide crosslinkable, in particular self-crosslinkable, copolymers which have a long shelf life in dispersion or solution, even in the presence of a crosslinking agent, and can be crosslinked at room temperature.

We have found that this object is achieved by the copolymers defined above and their use as coating materials or adhesives.

In the crosslinking of the copolymers, the oxime-blocked isocyanate groups of the polymerized monomers a) react with keto or aldehyde groups, probably according to the following scheme:

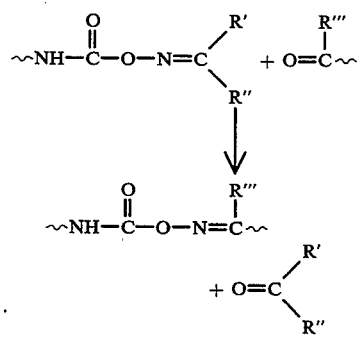

In this scheme, the crosslinking is effected by transoximation.

The content of copolymerizable ethylenically unsaturated compounds having at least one oxime-blocked isocyanate group (monomers a)) in the copolymer should be at least 0.01% by weight in order to ensure sufficient crosslinkability. A content above 40% by weight is generally unnecessary.

The content of monomers a) is preferably from 0.1 to 10, particularly preferably from 0.1 to 5, % by weight.

Monomers a) preferably contain only one copolymerizable ethylenically unsaturated bond. Furthermore, they preferably contain from one to three oxime-blocked isocyanate groups, particularly preferably one such group.

Examples of suitable monomers a) are the following compounds whose isocyanate groups are blocked by oximes:

(meth)acryloyl isocyanate, $C_1-C_{10}$-alkyl (meth)acrylates which are substituted in the alkyl radical by at least one, preferably one, isocyanate group, e.g. 2-isocyanato-ethyl (meth)acrylate or m- or p-isopropenyl-$\alpha,\alpha'$-dimethylbenzyl isocyanate.

Monomers a) can also be prepared in a simple manner by first reacting polyisocyanates, in particular diisocyanates, with ethylenically unsaturated compounds so that at least one free isocyanate group remains.

Suitable ethylenically unsaturated compounds are those which have at least one group reactive toward isocyanate, for example a primary or secondary amino group or preferably a hydroxyl group. These can be reacted in a known manner with a polyisocyanate with formation of urea or urethane. Preferably, ethylenically unsaturated compounds having a hydroxyl group, for example hydroxy-$C_1-C_{10}$-alkyl (meth)acrylates, are reacted with polyisocyanates, in particular diisocyanates Examples of suitable diisocyanates are those of the general formula $X(NCO)_2$, where X is an aliphatic hydrocarbon radical of 4 to 12 carbon atoms, a cycloaliphatic hydrocarbon radical of 6 to 15 carbon atoms or an aromatic or alkaromatic hydrocarbon radical of 6 to 15 carbon atoms.

Examples are butane 1,4-diisocyanate, hexane 1,6-diisocyanate, 2,2,4- and 2,4,4-trimethylhexamethylene diisocyanate, cyclohexane diisocyanate, methylcyclohexane diisocyanate, isophorone diisocyanate, 4,4'-diisocyanatodiphenylmethane, 4,4'-diisocyanatodicyclohexylmethane and 2,4- and 2,6-toluylene diisocyanate, The free isocyanate groups remaining after the reaction of the polyisocyanate with the ethylenically unsaturated compound are reacted with oximes so that at least one isocyanate group of the monomers a) is blocked with an oxime.

Suitable oximes for blocking the isocyanate groups of the monomers a) are oximes of aliphatic, cycloaliphatic or aromatic aldehydes or ketones, e.g. acetone oxime, methyl ethyl ketone oxime, diethyl ketoxime, methyl isopropyl ketoxime, methyl isobutyl ketoxime, diisopropyl ketoxime, cyclohexanone oxime, 2-methylcyclohexanone oxime, 2,6-dimethylcyclohexanone oxime, acetophenone oxime, benzophenone oxime and diethylglyoxime. Oximes of aliphatic ketones having a keto group and a total of 3 to 12 carbon atoms, in particular acetone oxime and methyl ethyl ketone oxime, are preferred.

The reaction of the oximes with the isocyanate-containing compounds (blocking of the isocyanate groups) can be carried out in a manner known to the skilled worker, in an inert organic solvent, for example an aromatic hydrocarbon, such as toluene, or in the absence of a solvent, from 20° to 150° C., preferably from 20° to 100° C.

The blocking reaction can advantageously be carried out in the presence of metal salts as catalysts, for example dibutyltin dilaurate or tin octoate.

The copolymers furthermore contain, as main monomers b), 30–99.99, preferably 70–99.9, particularly preferably 85–99.9, % by weight of a monomer selected from the group consisting of $C_1-C_{10}$-alkyl (meth)acrylates, vinyl esters of carboxylic acids of up to 20 carbon atoms, vinylaromatics of up to 20 carbon atoms, ethylenically unsaturated nitriles of 3 to 6 carbon atoms, vinyl halides and nonaromatic hydrocarbons having at least 2 conjugated double bonds and 4 to 8 carbon atoms.

Examples of main monomers are alkyl (meth)acrylates having a $C_1-C_{10}$-alkyl radical, such as methyl methacrylate, methyl acrylate, n-butyl acrylate, ethyl acrylate and 2-ethylhexyl acrylate.

In particular, mixtures of the alkyl (meth)acrylates are also suitable.

Vinyl esters of carboxylic acids of 1 to 20 carbon atoms are, for example, vinyl laurate, stearate, propionate and acetate.

Suitable vinylaromatic compounds are vinyltoluene, $\alpha$- and p-styrene, $\alpha$-butylstyrene, 4-n-butylstyrene, 4-n-decylstyrene and preferably styrene. Examples of nitriles are acrylonitrile and methacrylonitrile.

The vinyl halides are chlorine-, fluorine- or bromine-substituted ethylenically unsaturated compounds, preferably vinyl chloride and vinylidene chloride.

Examples of nonaromatic hydrocarbons having 2 to 8 carbon atoms and at least two olefinic double bonds are butadiene, isoprene and chloroprene, The main monomers are also preferably used as a mixture.

The copolymers may furthermore contain monomers having at least one aldehyde or keto group (monomers c)).

These are preferably monomers having one or two aldehyde or keto groups or one aldehyde and one keto group and an olefinic double bond capable of undergoing free radical polymerization.

For example acrolein, methacrolein, vinyl alkyl ketones where the alkyl radical is of 1 to 20, preferably 1 to 10, carbon atoms, formylstyrene, alkyl (meth)acrylates having one or two keto or aldehyde groups or one aldehyde and one keto group in the alkyl radical, the latter preferably comprising a total of 3 to 10 carbon atoms, for example (meth)acrylyloxyalkylpropanals, as described in DE-A-27 22 097, are suitable. N-Oxoalkyl-(meth)acrylamides as disclosed in, for example, U.S. Pat. No. 4,226,007, DE-A-20 61 213 or DE-A-22 07 209 are also suitable.

Acetoacetyl (meth)acrylate, acetoacetoxyethyl (meth)acrylate and in particular diacetone acrylamide are particularly preferred.

The content of these monomers is in general from 0 to 30, in particular from 0 to 10, particularly preferably from 0 to 5, % by weight.

The copolymer may be self-crosslinkable or externally crosslinkable. In the case of self-crosslink-ability, it contains both copolymerizable oxime ethers and monomers having at least one keto or aldehyde group. Crosslinking then occurs without the addition of a crosslinking agent, by reaction of the oxime group with the keto or aldehyde group in the same copolymer.

The content of the monomer having at least one keto or aldehyde group c) in the copolymer should then be at least 0.01, preferably at least 0.1, % by weight. The maximum possible amount of the main monomer is then reduced by 0.01 or 0.1% by weight, respectively.

Examples of further monomers d) which differ from the monomers a) to c) and may be present in the copolymer are esters of acrylic and methacrylic acid with alcohols of 1 to 20 carbon atoms, which contain at least one further hetero atom in addition to the oxygen atom in the alcohol group and/or which contain an aliphatic or aromatic ring, such as 2-ethoxyethyl acrylate, 2-butoxyethyl (meth)acrylate, dimethylaminoethyl (meth)acrylate, diethylaminoethyl (meth)acrylate, aryl, alkaryl or cycloalkyl (meth)acrylates, such as cyclohexyl (meth)acrylate, phenylethyl (meth)acrylate or phenylpropyl (meth)acrylate, or acrylates of heterocyclic alcohols, such as furfuryl (meth)acrylate.

Further monomers, such as (meth)acrylamide and derivatives thereof substituted on the nitrogen by $C_1$–$C_4$-alkyl are also suitable.

Monomers having hydroxyl functional groups, for example $C_1$–$C_{15}$-alkyl (meth)acrylates which are substituted by one or two hydroxyl groups, are also important. Particularly important comonomers having hydroxyl functional groups are $C_1$–$C_8$-hydroxyalkyl (meth)acrylates, such as n-hydroxyethyl, n-hydroxypropyl or n-hydroxybutyl (meth)acrylate.

The presence of comonomers having salt-forming groups is advisable for the preparation of self-dispersible copolymers which are suitable, for example, for aqueous secondary dispersions. Monomers having salt-forming groups are in particular itaconic acid, acrylic acid and methacrylic acid.

The amount of the further comonomers in the copolymer may be from 0 to 50, preferably from 0 to 20, very particularly preferably from 0 to 10, % by weight.

The copolymer A) is prepared by free radical polymerization. Suitable polymerization methods, such as mass, solution, suspension or emulsion polymerization, are familiar to the skilled worker.

The copolymer is preferably prepared by solution polymerization with subsequent dispersing in water, or particularly preferably by emulsion polymerization.

In the emulsion polymerization, the comonomers may be polymerized in the usual manner in the presence of a water-soluble initiator and of an emulsifier at, preferably, from 30° to 95° C.

Examples of suitable initiators are sodium persulfate, potassium persulfate, ammonium persulfate, tert-butyl hydroperoxides, water-soluble azo compounds and redox initiators.

Examples of emulsifiers used are alkali metal salts of relatively long-chain fatty acids, alkylsulfates, alkylsulfonates, alkylated arylsulfonates or alkylated diphenyl ether sulfonates. Other suitable emulsifiers are reaction products of alkylene oxides, in particular ethylene oxide or propylene oxide, with fatty alcohols, fatty acids or phenol, or alkylphenols.

In the case of aqueous secondary dispersions, the copolymer is first prepared by solution polymerization in an organic solvent and then dispersed in water without the use of an emulsifier or dispersant, with the addition of salt formers, for example of ammonia to carboxyl-containing copolymers. The organic solvent can be distilled off. The preparation of aqueous secondary dispersions is familiar to the skilled worker and is described, for example, in DE-A-37 20 860.

In order to adjust the molecular weight, regulators may be used in the polymerization. For example, -SH-containing compounds, such as mercaptoethanol, mercaptopropanol, thiophenol, thioglycerol, ethyl thioglycolate, methyl thioglycolate and tert-dodecyl mercaptan, are suitable.

The type and amount of the comonomers is expediently such that the copolymer obtained has a glass transition temperature of preferably from −60° to +140° C., particularly preferably from −30° to +80° C. and very particularly preferably, especially when used as an adhesive, from −30° to +20° C. The glass transition temperature of the copolymer can be determined by conventional methods, such as differential thermal analysis or differential scanning calorimetry (cf. for example ASTM 3418/82, midpoint temperature).

A compound which contains at least two keto or aldehyde groups or at least one keto and one aldehyde group may be added, as a crosslinking agent, to the novel copolymer, or the copolymer can be used for crosslinking such compounds.

Examples of particularly suitable crosslinking agents are free radical copolymers, which are also referred to below as polymeric crosslinking agents and contain abovementioned monomers c) as polymerized units.

For example, the polymeric crosslinking agents which are composed of 30–99.9, preferably 70–99.9, % by weight of the monomers b), 0.01–30, preferably 0.1–10, % by weight of the monomers c) and 0–50, preferably 0–20, % by weight of the monomers d) are suitable. The statements made above about the above copolymers are preferably applicable with regard to the type of the monomers, the glass transition temperature and the preparation.

If desired, the crosslinking agent is preferably added to the solution or dispersion of the novel copolymers.

However, it is also possible not to combine the copolymer and the crosslinking agent until they are used, for example for coating surfaces. For this purpose, for example, the crosslinking agent could first be applied as a primer to the surface and the coating then effected with the dispersion or solution of the copolymers.

The solution or dispersion of the novel copolymers is suitable, for example, for use as a coating material for various substrates having plastic, wood or metal surfaces or, for example, for textiles, nonwovens, leather or paper. They are also suitable for applications in building chemistry, for example as adhesives, sealing compounds, binders or the like.

Depending on the intended use, the dispersions or solutions may also contain conventional assistants and additives. These include, for example, fillers, such as quartz powder, quartz sand, finely divided silica, barite, calcium carbonate, chalk, dolomite or talc, which are often used together with suitable wetting agents, for example polyphosphates, such as sodium hexametaphosphate, naphthalenesulfonic acid or ammonium or sodium polyacrylates, the wetting agent being added in general in an amount of from 0.2 to 0.6% by weight, based on the filler.

Fungicides for preservation may also be added. These are generally used in amounts of from 0.02 to 1% by weight, based on the dispersions or solutions. Examples of suitable fungicides are phenol or cresol derivatives or organotin compounds.

The dispersions or solutions are also particularly suitable as sealing compounds or adhesive formulations, in particular as laminating adhesives for the production of laminate films and high-gloss films. As such, they may also contain, in addition to the abovementioned additives, specific assistants and additives conventionally used in adhesives technology. These include, for example, thickeners, plasticizers or tackifiers, for example, natural resins or modified resins, such as rosin esters, or synthetic resins, such as phthalate resins.

The dispersions or solutions of the self-crosslinking or externally crosslinked copolymers which also contain a crosslinking agent have a long shelf life. Crosslinking occurs at as low as room temperature with volatilization of the solvent.

The coatings or adhesive bonds produced using these dispersions or solutions have good resistance to chemicals or solvents and good internal strength (cohesion).

EXAMPLES

I. Preparation of Copolymerizable Compounds (Monomers) having an oxime-blocked isocyanate group.

Monomer 1 (M1)

222 g (1.0 mol) of isophorone diisocyanate were added to 116 g (1.0 mol) of 2-hydroxyethyl acrylate in the course of 30 minutes, the temperature being kept at below 80° C. by cooling. After 2 hours at 80° C., an NCO content of 12.1% was reached (theoretically 12.4%). 87 g (1.0 mol) of butanone oxime were added to this adduct and stirring was carried out for 2 hours at 60° C.

Monomer 2 (M2)

87 g (1.0 mol) of butanone oxime were added to 201 g (1.0 mol) of meta-isopropenyl-α,α'-dimethylbenzyl isocyanate at room temperature in the course of 30 minutes. The temperature increased to 46° C. during this procedure. The reaction was complete after 2 hours.

II. Preparation of Copolymer Dispersions

Copolymer Dispersion D1

200 g of demineralized water, 37 g of feed 1 and 20 g of feed 2 were initially taken in a reaction vessel having a stirrer and two feed vessels (feed 1 and feed 2) and were heated to 85° C. After 15 minutes, feed 1 was added uniformly to the reaction vessel in the course of 2 hours and feed 2 was introduced uniformly in the course of 2.5 hours. After the final addition of initiator (feed 2), the dispersion was stirred for a further hour at 85° C.

Feed 1: (This feed was stirred during the polymerization)
- 107 g of demineralized water
- 400 g of ethyl acrylate
- 90 g of methyl methacrylate
- 50 g of 20% strength by weight aqueous diacetone acrylamide solution
- 50 g of 20% strength by weight solution of the sodium salt of p-dodecyldiphenyl ether disulfonate in water (emulsifier)
- 50 g of 20% strength by weight solution of the reaction product of p-isononylphenol with about 50 mol of ethylene oxide in water (emulsifier)

Feed 2:
- 100 g of demineralized water
- 3 g of sodium persulfate

Further copolymer dispersions D2 to D5 were prepared according to the above method. The monomer composition is shown in Table 1. Dispersions D2 to D5 are according to the invention and contain either monomer 1 or monomer 2, whose preparation is described above.

TABLE 1

| Composition of the copolymers in % by weight | | | | | |
|---|---|---|---|---|---|
| Copolymer dispersion | EA | MMA | DAAM | M1 | M2 |
| D1 | 80 | 18 | 2 | — | — |
| D2 | 74.7 | 18 | 2 | 5.6 | — |
| D3 | 76.2 | 18 | 2 | — | 3.8 |
| D4 | 76.4 | 18 | — | 5.6 | — |
| D5 | 78.2 | 18 | — | — | 3.8 |

Abbreviations:
EA: Ethyl acrylate
MMA: Methyl methacrylate
DAAM: Diacetone acrylamide Testing of the dispersions for crosslink-ability and performance characteristics

Crosslinkability (Testing by Swelling Behavior)

Dispersions D1 (for comparison), D2 and D3 (self-crosslinking) and mixtures of dispersions D4 and D5 with D1 (externally crosslinking) in a weight ratio of 1:1 were tested.

Films were cast from 200 g each of the resulting mixtures D1/D4 and D1/D5 or 200 g of dispersions D1-D3, and the films were dried for 1 week at room temperature. Thereafter, the swelling behavior was investigated in tetrahydrofuran as a measure of the degree of crosslinking of these films by storing about 1 g of the film samples in tetrahydrofuran for 24 hours and measuring the solvent absorption in % by weight (results in Table 2).

In the case of crosslinked polymers, swelling occurs through the absorption of solvent. The swelling decreases with increasing degree of crosslinking since less solvent can be absorbed by the densely crosslinked polymer. Uncrosslinked poisoners are dissolved by solvents.

III. Production of Laminated Films

The above dispersions and mixtures were applied by knife coating to polyethylene terephthalate (PETP) film heated to 50° C. to give a layer which had a thickness of 3 g/m² when dry, and were laminated after 20 seconds with a polyethylene film (PE, corona-pretreated). Thereafter, the films were stored for 7 days at room temperature and under standard humidity conditions and then cut into 2 cm wide strips. These strips were then peeled at an angle of 180° and a speed of 100 m/min, at 23° C. The peeling force in N for the 2 cm wide strips was determined (Table 2).

IV. Production of High-gloss Films

The above dispersions and mixtures thereof were applied by knife coating to cardboard packaging printed with offset inks to give a layer which had a thickness of 5 g/m² when dry, and said layer was dried at 60° C. and, after about 30 seconds, laminated with biaxially oriented polypropylene films (o-PP).

A test was carried out to determine whether paper or ink is torn out from the cardboard packaging when the film is pulled off (peel test) (rating 1: paper or ink completely torn out (good adhesion of the film), rating 2: paper or ink partly torn out) and whether the film undergoes delamination or does not adhere firmly in the region of grooves (indentations in the cardboard packaging) (groove stability; +=no delamination at the groove, —=delamination at the groove and ±=partial delamination at the groove) (results in Table 2).

TABLE 2

| Dispersion | Solvent absorption % by weight | High-gloss films Peel test | High-gloss films Groove stability | Laminated films Peel strength N/cm |
|---|---|---|---|---|
| D1 | dissolved | 2 | — | 0.5 |
| D2 | 800 | 1 | + | 2.8 |
| D3 | 920 | 1 | + | 2.3 |
| D1/D4*) | 950 | 1 | + | 2.7 |
| D1/D5*) | 1030 | 1 | + | 2.1 |

*)Weight ratio of the dispersions 1:1 (based on the solid)

We claim:

1. A copolymer composed of
   a) from 0.01 to 40% by weight of a copolymerized ethylenically unsaturated compound having at least one isocyanate group blocked with an oxime,
   b) from 30 to 99.98% by weight of at least one monomer selected from the group consisting of $C_1$–$C_{20}$-alkyl (meth)acrylates, vinyl esters of carboxylic acids of 1 to 20 carbon atoms, vinylaromatics of up to 20 carbon atoms, ethylenically unsaturated nitriles of 3 to 6 carbon atoms, vinyl halides and nonaromatic hydrocarbons of 4 to 8 carbon atoms having at least 2 conjugated double bonds,
   c) from 0.01 to 30% by weight of at least one comonomer having at least one keto or aldehyde group, and
   d) from 0 to 50% by weight of at least one further monomer.

2. A substrate coated with a copolymer as claimed in claim 1.

* * * * *